United States Patent
Bailey et al.

(10) Patent No.: US 8,904,496 B1
(45) Date of Patent: Dec. 2, 2014

(54) AUTHENTICATION BASED ON A CURRENT LOCATION OF A COMMUNICATIONS DEVICE ASSOCIATED WITH AN ENTITY

(75) Inventors: Daniel V. Bailey, Pepperell, MA (US); Lawrence N. Friedman, Arlington, MA (US); Yedidya Dotan, Tel Aviv (IL); Samuel Curry, North Andover, MA (US); Riaz Zolfonoon, Concord, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/435,951

(22) Filed: Mar. 30, 2012

(51) Int. Cl.
*G06F 21/00* (2013.01)
*G06F 21/44* (2013.01)

(52) U.S. Cl.
CPC ............. *G06F 21/44* (2013.01); *H04L 2209/80* (2013.01)
USPC ................................ 726/5; 713/176; 709/224

(58) Field of Classification Search
CPC ..... H04W 64/00; H04L 2209/80; G06F 21/44
USPC .............................................. 713/155; 726/5
See application file for complete search history.

(56) References Cited

U.S. PATENT DOCUMENTS

| | | | |
|---|---|---|---|
| 7,013,149 B2 * | 3/2006 | Vetro et al. | 455/456.1 |
| 7,356,332 B2 * | 4/2008 | Pell et al. | 455/414.1 |
| 7,614,078 B1 * | 11/2009 | Stieglitz | 726/2 |
| 8,555,355 B2 * | 10/2013 | Rathbun | 726/5 |
| 2006/0256008 A1 * | 11/2006 | Rosenberg | 342/367 |
| 2009/0005077 A1 * | 1/2009 | Forstall et al. | 455/456.2 |
| 2010/0024017 A1 * | 1/2010 | Ashfield et al. | 726/7 |
| 2012/0180124 A1 * | 7/2012 | Dallas et al. | 726/22 |

* cited by examiner

*Primary Examiner* — Hadi Armouche
*Assistant Examiner* — Bryan Wright
(74) *Attorney, Agent, or Firm* — Krishnendu Gupta; Jason A. Reyes

(57) ABSTRACT

There is disclosed a method and system for use in authenticating an entity in connection with a computerized resource. An authentication request is received from entity for access to computerized resource. An input signal is received from a communications device associated with entity. The input signal comprises current location of communications device. The current location of communications device is derived from input signal. A location history in connection with communications device is captured. The location history comprises a record of discrete locations visited by communications device over a period of time. An analysis is performed between current location of the communications device and location history in connection with communications device. An authentication result is generated based on analysis between current location of communications device and location history in connection with communications device. The authentication result can be used for authenticating entity.

18 Claims, 4 Drawing Sheets

AUTHENTICATION BASED ON A CURRENT LOCATION OF A COMMUNICATIONS DEVICE ASSOCIATED WITH AN ENTITY

TECHNICAL FIELD

The present invention relates to authenticating an entity in connection with a computerized resource.

BACKGROUND OF THE INVENTION

Generally, security systems employ an identity-based authentication scheme to verify the identity of an entity before granting access to a computer system or a computerized resource. One goal of such security systems is to accurately determine identity so that an unauthorized party cannot gain access. Security systems can use one or more of several factors, alone or in combination, to authenticate entities. For example, security systems can be based on something that the entity knows, something the entity is or something that the entity has.

Examples of something an entity knows are a code word, password, personal identification number ("PIN") and the like. Examples of something the entity is include a distinct characteristic or attribute known as a biometric. An example of something an entity possesses is a physical or digital object, referred to generally as a token, that is unique, or relatively unique, to the user.

However, it will be appreciated that the threat in connection with security systems is increasing. For example, a password or token may easily be compromised. Indeed, even though it is a little more difficult, it is possible to fraudulently create a copy of a biometric. For example, for voice authentication a user's voice may be recorded and later used to initiate authentication. Therefore, there is a need for further security measures when verifying the identity of an entity before granting access to a computer system or a computerized resource.

SUMMARY OF THE INVENTION

There is disclosed a method and system for use in authenticating an entity in connection with a computerized resource. An authentication request is received from the entity for access to the computerized resource. An input signal is received from a communications device associated with the entity. The input signal comprises the current location of the communications device. The current location of the communications device is derived from the input signal. A location history in connection with the communications device is captured. The location history comprises a record of discrete locations visited by the communications device over a period of time. An analysis is performed between the current location of the communications device and the location history in connection with the communications device. An authentication result is generated based on the analysis between the current location of the communications device and the location history in connection with the communications device. The authentication result can be used for authenticating the entity.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is disclosed herein a technique for use in authenticating an entity in connection with a computerized resource. The technique relates to gathering different types of data relating to location and computing a risk score appropriately. For example, the technique can gather location data relating to geo-location of a wireless device and proximity to other wireless devices to assist in authentication. In addition, the technique can gather data about speed and direction to identify convoys of devices traveling together to assist in authentication. By profiling all of these attributes, machine learning techniques can be used to identify locations and situations that are more or less risky. The overall risk score can take one or more of these factors into account.

Figure 1:
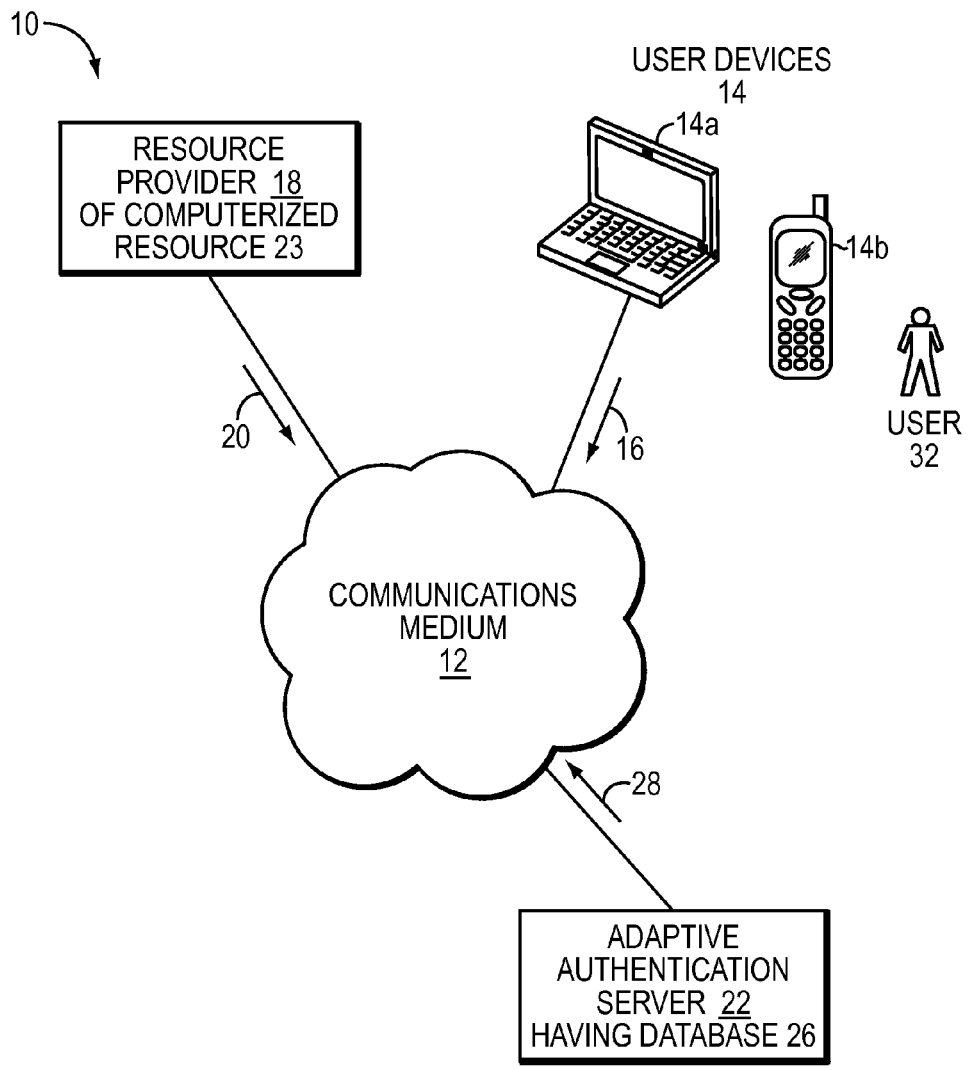
FIG. 1 is a diagram illustrating an example environment for implementing the technique as described herein.

Referring to FIG. 1, there is illustrated an example environment 10 for implementing the technique of authenticating an entity in connection with a computerized resource as described herein. It will be understood that in this embodiment the entity is a human user. The environment 10 comprising user devices 14, a communications medium 12, a resource provider 18 and an adaptive authentication server 22.

The user devices 14 can be smartphones, personal digital assistants, laptop computers, desktop computers, tablet computers, cameras, MP3 players, portable game systems, and the like constructed and arranged to submit an authentication request 16 to the resource provider 18 via the communications medium 12 which then delegates the authentication task to the adaptive authentication server 22. However, it will be appreciated that in some embodiments the authentication request 16 may be sent direct to the adaptive authentication server 22 over the communications medium 12 rather than indirectly through the resource provider 18. It will also be appreciated that the authentication request may comprise a username or user identifier in order to facilitate identification of the user.

It will be understood that during at least one embodiment of the technique described herein a user 32 may comprise both a laptop computer 14a and a communications device 14b with GPS capability or other location determining capability as illustrated in the first figure. For example, the communications device 14b can be a mobile wireless communications device such as a smartphone. It will be appreciated that in this embodiment the laptop computer 14a may facilitate access to the resource provider 18 via the communications medium 12 and the smartphone 14b may perform its usual functionality. However, it will be appreciated that the above example is for illustration purposes only as it will be evident that the smartphone 14b may also be configured to facilitate access to the resource provider 18 as well as perform its usual other functionality. In such a scenario, the laptop 14a may be superfluous for the purposes of implementing the invention as described herein.

The communications medium 12 provides network connections between the user devices 14, the resource provider 18 and the adaptive authentication server 22. The communications medium 12 can implement a variety of protocols such as TCP/IP, UDP, ATM, Ethernet, Fibre Channel, combinations thereof, and the like. Furthermore, the communications medium 12 can include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

The resource provider 18 can provide the user 32 of the user devices 14 with access to one or more computerized resources 23 following successful user authentication. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

The adaptive authentication server 22 as will be described in further detail below is configured to receive an authentication request 20 from the resource provider 18 over the communications medium 12. It will be appreciated from the foregoing that the adaptive authentication server 22 may in some embodiments receive the authentication request direct from the user device 14. In either embodiment, the authentication request is sent to the adaptive authentication server 22 in order to authenticate the identity of the user 32 by performing risk-based authentication.

It will also be understood that in this embodiment the adaptive authentication server 22 includes a location history database 26 for storing or recording location history in connection with the communications device 14b. It will be also understood that in this embodiment the location history of the communications device 14b will be assumed to emulate the location of the user 32. It will be further understood that the adaptive authentication server 22 is configured for performing risk-based assessment by determining the current location of the mobile communications device 14b and performing an analysis between the current location and the location history as will be described in further detail below. It will be still further understood that the adaptive authentication server 22 is constructed and arranged to send an adaptive authentication result 28 to the resource provider 18 via the communications medium 12 on completion of the risk based authentication in the server 22 in order to grant or deny authentication to the computerized resource 23.

Figure 2:
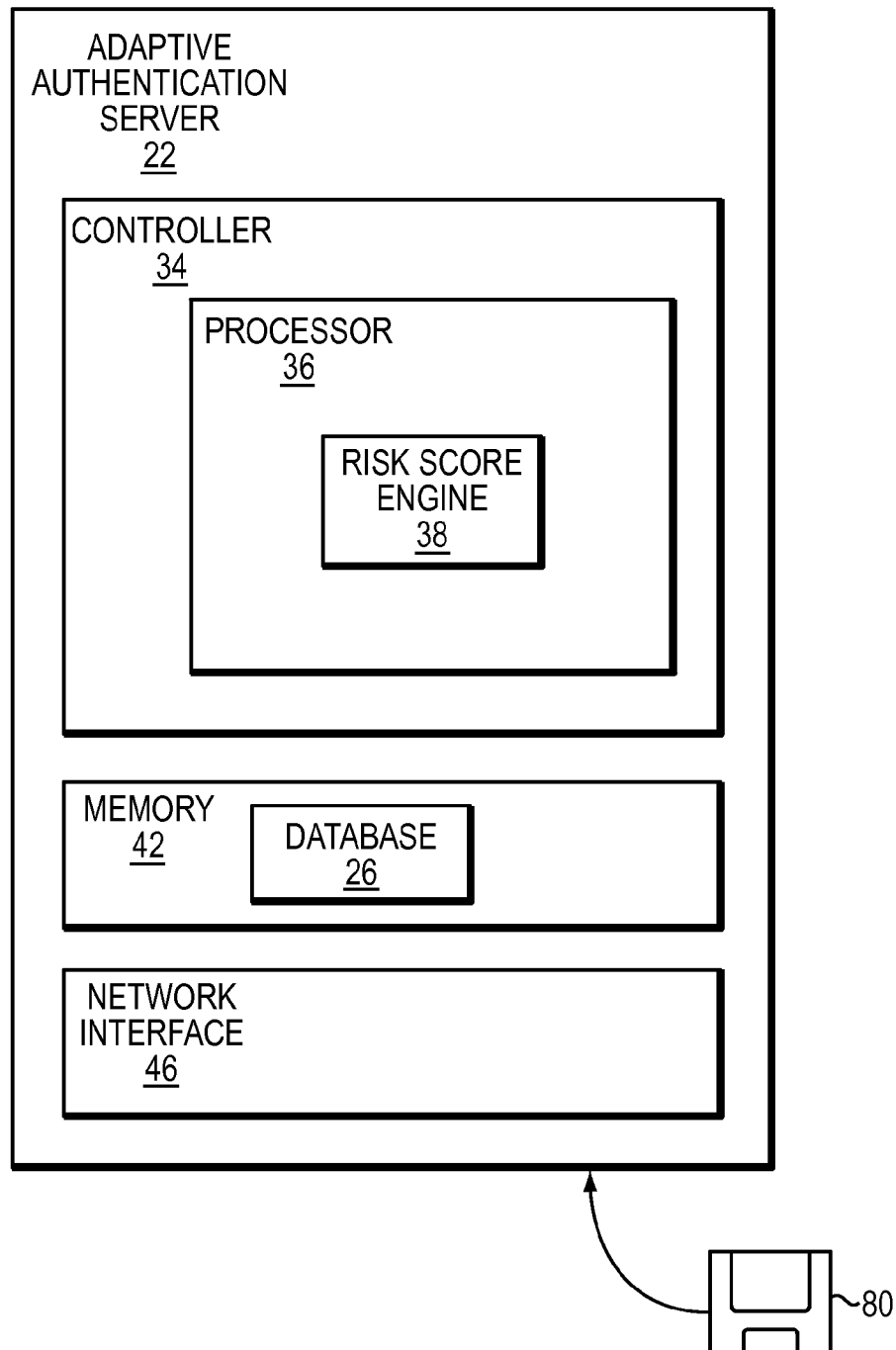
FIG. 2 is a diagram illustrating an example adaptive authentication server within the environment illustrated in FIG. 1.

Referring to FIG. 2, there is illustrated the components of the adaptive authentication server 22. The adaptive authentication server 22 comprising a network interface 46, a memory 42 and a controller 34.

The network interface 46 is constructed and arranged to send and receive data over the communications medium 12. Specifically, in this embodiment, the network interface 46 is configured to receive authentication request 20 from resource provider 18 over communications medium 12 and to send authentication result 28 to the resource provider 18 over communications medium 12.

The memory 42 is configured to store the location history database 26 which includes a record of discrete recorded locations visited by the communications device 14b over a period of time. The location history can also include the location history of the device with respect to another device. It will be appreciated that the user may complete an enrollment process in order to store the historical location data in the database 26 of the adaptive authentication server 22. For example, the user 32 may collect location data over a period of time using the GPS capabilities in the smartphone 14b and subsequently submit such location data to the database in the server 22. It will be appreciated that in this embodiment the location of the smartphone will be assumed to emulate the location of the user 32. It will also be understood that the database 26 can be configured for storing multiple data entries with each data entry including a communications device identifier, a location of the communications device and a timestamp. For example, the database 26 can comprise data entries associating the smartphone 14b, the geolocation co-ordinates of the smartphone and the time at which the smartphone visited the geolocation co-ordinates. It will be further appreciated that the database may comprise multiple entries which may be updated periodically. The memory 42 generally takes the form of, e.g., random access memory, flash memory or a non-volatile memory.

The controller 34 includes a processor 36 which takes the form of, but is not limited to, Intel or AMD-based MPUs, and can include a single or multi-cores each running single or multiple threads. The processor 36 is coupled to memory 42 and includes a risk score engine 38 constructed and arranged to assign a risk score to an authentication request based on the location history of the communications device 14b in the database 26 and the current location of the communications device 14b.

At this point, it should be understood that the controller 34 of the authentication server 22 is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product is capable of delivering all or portions of the software. The computer program product 80 has a non-transitory (or non-volatile) computer readable medium which stores a set of instructions which controls one or more controller operations. Examples of suitable computer readable storage media include tangible articles of manufacture and apparatus which store instructions in a non-volatile manner such as CD-ROM, flash memory, disk memory, tape memory, and the like.

Figure 3:
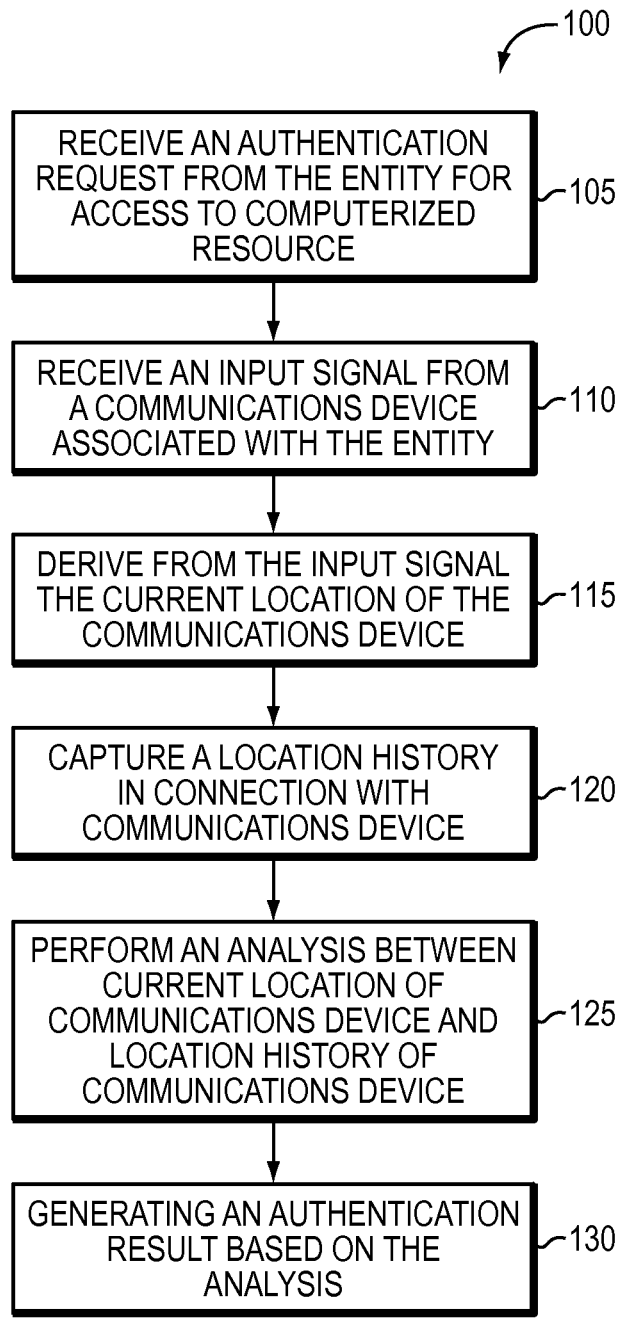
FIG. 3 is a flowchart summarizing the steps of a technique for use in authenticating an entity in connection with a computerized resource.

Referring to FIG. 3, there is illustrated a technique 100 for use in authenticating an entity in connection with a computerized resource 23 in an environment 10 substantially similar to that as described above. It will be appreciated that in this embodiment the entity is a human user. The technique comprises receiving 105 an authentication request from the user for access to the computerized resource 23. For example, the user 32 may send an authentication request 16 using the laptop computer 14a to the resource provider 18 of computerized resource 23. The authentication request 16 is sent to the resource provider 18 over the communications medium 12 before the resource provider 18 sends an authentication request 20 to the authentication server 22. It will be understood that the authentication request 20 may be received in the authentication server 22 by the network interface 46.

Additionally, the technique comprises receiving 110 an input signal from a communications device associated with the user. It will be appreciated that the input signal is also received in the adaptive authentication server 22 over the communications network 12 by the network interface 46 and may be saved in memory 42. It will be further appreciated that the input signal comprises the current location of the communications device 14b which is associated with the user 32 and a timestamp indicating the time at which the location was determined by the communications device. For example, the authentication server 22 may receive the input signal by requesting the current location of the communications device 14b in response to receiving the authentication request 20 from the user 32 in the authentication server 22. The device, in accordance with the technique as described here, can be configured for transmitting the current location of the communications device 14b in response to receiving the request from the authentication server 22. With such an approach, the authentication server can receive the current location of the communications device 14b.

The technique comprises deriving 115 from the input signal the current location of the communications device. For example, the processor 36 is configured for deriving the current location of the communications device 14b from the received input signal. It will be appreciated that the location may be geolocation co-ordinates in connection with the communications device 14b. However, it will also be appreciated that in some embodiments, the current location may be the location of the device 14b with respect to another device. For example, the other device may be a Wi-Fi access point, a RFID reader and the like. Based on the type of device, transmission power, and propagation characteristics, the technique can infer the accuracy of the location with respect to the other device. In some embodiments, the received input signal may include both geolocation co-ordinates and one or more indications of identity of another device and one or more indications of radio type, transmission power, and propagation characteristics.

In some embodiments, the communications device 14b may represent a plurality of devices represented by one or more input signal. In such a scenario, the server may additionally verify that the plurality of devices have locations consistent with one another.

In some embodiments, the laptop and one or more devices 14b may communicate with the server 22 over a plurality of communication media 12. It will be appreciated that various media may be considered by the server to be more or less risky. For example, a network route to device 14b that traverses the Internet before arriving at a marketer of residential Internet services such as a cable TV provider may cause the server to modify transaction risk score up or down accordingly. In another embodiment, the network route may include a cellular telephone provider which also may cause the server to modify the risk score.

The technique comprises capturing 120 a location history in connection with the communications device. The location history comprising a record of discrete locations visited by the communications device 14b over a period of time. It will be understood that the device 14b may be associated with the user such that as the user 32 travels the device 14b will be assumed to visit discrete locations emulating the user's movement. It will be appreciated that the adaptive authentication server 22 can store the location history in the database 26 in memory 42 by capturing, for example, the GPS location data from the communications device 14b over a period of time.

The technique comprises performing 125 an analysis between the current location of the communications device 14b and the location history in connection with the communications device. For example, the processor 36 performs an analysis between the derived current location and location history of the communications device based on locations visited by the communications device and stored in the database 26. This will be described in further detail below.

The technique generates 130 an authentication result based on the analysis between the current location of the communications device 14b and the location history in connection with the communications device. It will be appreciated that the authentication result can be used for authenticating the user. The authentication result comprises outputting, as an authentication signal, a risk score based on at least one risk factor. It will be appreciated that in this embodiment the result of the analysis between the current location of the communications device and the location history of the communications device is one factor. The risk score may form part of the adaptive authentication result 28 sent to the resource provider 18 via the communications medium 12. In one embodiment, the risk score enables granting of access to the computerized resource in response to the risk score exceeding a predefined threshold and denying access to the computerized resource in response to the risk score not exceeding the predefined threshold.

Figure 4:
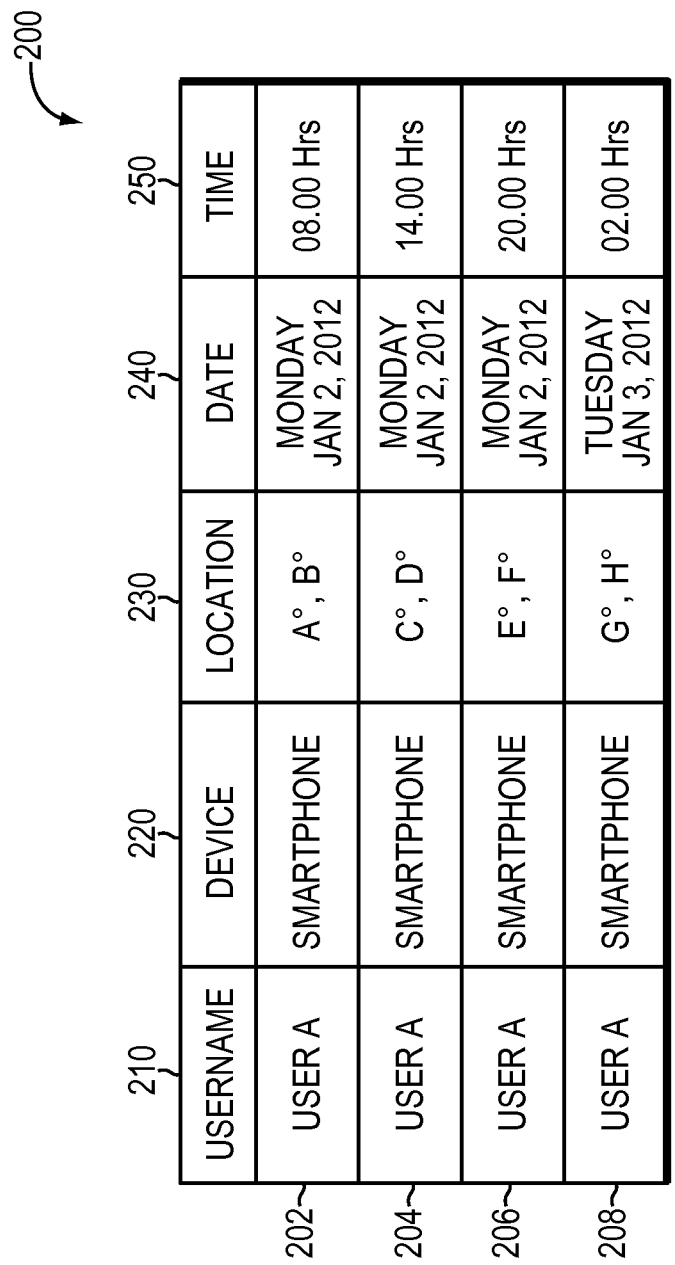
FIG. 4 is a diagram illustrating an example of a location history record in connection with a communications device.

Referring to FIG. 4, there is illustrated an example of a location history record 200 in connection with the communications device 14b. For example, the location history record may be similar to that as stored in the database 26 in the adaptive authentication server 22. It will be understood that the location history record comprises multiple data entries (202, 204, 206, 208) in connection with the communications device. It will also be understood that each data entry comprises a username 210, a device identification 220, location information 230, date 240 and time 250. It will be understood from the figure that the location history record 200 relates to a period starting 08.00 hours on Jan. 2, 2012 and finishing 02.00 hours on Jan. 3, 2012. However, it will be appreciated that this period is for illustration purposes only and that there can be a plurality of data entries over a much longer period of time. Indeed, the time difference between the data entries in some embodiments may be substantially less than six hours. It will also be understood from the foregoing that the data may have been collected by the communications device 14*b* using the GPS capability and submitted to the authentication server 22 to be saved in the database 26. It will be further understood that such location data in connection with the communications device 14*b* is assumed to emulate the location of the user.

It can be seen from the figure that each data entry 202, 204, 206 and 208 relates to User A and that the communications device is a smartphone 14*b*. It can also be seen that the smartphone 14*b* was located at co-ordinates A° B° (longitude, latitude) on Monday Jan. 2, 2012 at 08.00 hours. It can also be seen that the smartphone 14*b* was located at co-ordinates C° D° (longitude, latitude) on Monday Jan. 2, 2012 at 14.00 hours. It can also be seen that the smartphone 14*b* was located at co-ordinates E° F° (longitude, latitude) on Monday Jan. 2, 2012 at 20.00 hours. It can also be seen that the smartphone 14*b* was located at co-ordinates G° H° (longitude, latitude) on Tuesday Jan. 3, 2012 at 02.00 hours.

It will be appreciated as disclosed previously that the locations in connection with the smartphone 14*b* are assumed to emulate the locations of the user 32. For example, the co-ordinates A° B° at 08.00 hours may correspond to a location on the user's route to work. Additionally, the co-ordinates C° D° at 14.00 hours may correspond to a location at work. Furthermore, the co-ordinates E° F° at 20.00 hrs may correspond to a location that the user uses for taking a walk each evening. Moreover, the co-ordinates G° H° at 02.00 hours may correspond to the location of the user's home.

It will be appreciated by those skilled in the art that the risk score generated by the risk engine 38 is based on a set of Bayesian weights each of which corresponds to the location in connection with the communications device. It will be further appreciated that the value of each Bayesian weight is derived from values of the location to which the Bayesian weight corresponds for previous locations which are stored in database 26. It will be understood that a weight value assigned to a geographical area is in inverse proportion to a likelihood that a random user would be in that geographical area. It will be evident that a very high weight value would be assigned to a geographical area or location in the middle of the Atlantic Ocean as it is very unlikely that a user would be in this area. However, if the location corresponds to a work location, a very low weight value would be assigned as it is more likely the person would be at this location. It will also be appreciated that the weight value may depend on the location and the time of day at that particular location. For example, if someone attempts to authenticate from a work location late at night when the user is typically at home then a much higher weight value may be assigned.

It will be appreciated that during operation the technique can perform an analysis between the current location of the device and the location history in connection with the communications device at a particular time. It will also be appreciated that the authentication request or input signal may have a timestamp associated therewith enabling analysis by the processor 36 with the location history at that particular time. The risk engine 38 will generate a risk score based on the analysis.

Additionally, it will be appreciated that the adaptive authentication server may be configured to infer patterns of location. For example, it will be appreciated that the time and location may frequently correspond enabling the risk engine to identify patterns of behavior. In this way, the risk engine will be able to use such information when generating a risk score.

Moreover, it will be appreciated that the adaptive authentication server may be configured to infer the context of the location patterns. For example, if a user is located in a certain location at 09.00 hours to 17.00 hours it can be determined by the risk engine that the user is at work and a risk score is generated accordingly.

Furthermore, it will be appreciated that the adaptive authentication server may be configured to extract information from the location in order to further challenge the user. For example, if the current location is determined to be a location at work the user may be further challenged with a question such as "what is the name of your employer?"

Moreover, it will be appreciated that the adaptive authentication server may be configured to include a user profile which may be combined or form part of location history in connection with the communications device. For example, if the user has never left the U.S.A., the aforementioned travel detail with respect to the user will be included in the user profile meaning that if the current location of the communications device is in Europe the risk engine will be configured to generate a much higher risk score.

Furthermore, the adaptive authentication server may be configured for recognizing that certain locations are of a greater threat. For example, it will be appreciated that certain countries, or areas within a metropolitan area, tend to be of greater threat than others. The risk engine may be configured to take this into account when generating a risk score. In addition, it will be appreciated that certain countries or areas within a metropolitan area may be transiently subject to additional risk factors. For example, a temporary influx of people may be expected in an area due to a large sporting event, concert or the like.

While the above technique describes that an enrollment type process may be performed in order to store the historical location data in the database 26 of the adaptive authentication server 22, it will be understood further records of discrete recorded locations visited by the communications device may be captured and the location history in the database may be periodically updated in response to capturing further records.

While the above technique describes determining the location of the communications device such as the geolocation co-ordinates, it will be appreciated that the location may be the location of the device with respect to another device. For example, the communications device may typically be accompanied by another device which enables communication therebetween. It will be understood that the location history may comprise details with respect to the relationship between the communications device and the other device enabling a subsequent analysis between current location and location history.

While the above technique describes receiving the current location of the communications device, it should be understood that the technique may receive a plurality of current location signals enabling the technique to determine if the user is moving and at what speed and in which direction. This information may be subsequently used to assist in the authentication of the user.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for use in authentication, the method comprising:

storing a location history in connection with a communications device associated with an entity, wherein the location history comprises locations visited by the communications device and times associated with the visits to those locations;

receiving an authentication request to authenticate the identity of the entity requiring access to a computerized resource;

receiving a current location of the communications device associated with the entity and a current time;

based on the location history, the current location, and the current time, performing an analysis;

based on the analysis, determining a challenge to issue to the entity; and based on the challenge, generating an authentication result, wherein the authentication result can be used for granting the entity access to the computerized resource.

2. The method as claimed in claim 1, further comprising:
capturing further records of discrete locations visited by the communications device; and
updating the location history in response to capturing further records.

3. The method as claimed in claim 1, wherein the current location comprises the current geolocation co-ordinates of the communications device.

4. The method as claimed in claim 1, wherein the current location comprises the location of the communications device with respect to at least one other device.

5. The method as claimed in claim 1, wherein the location history comprises multiple records with each record including a communications device identifier, a location of the communications device and a timestamp.

6. The method as claimed in claim 1, wherein generating the authentication result comprises outputting, as an authentication signal, a risk score.

7. The method as claimed in claim 6, further comprising:
granting access to the computerized resource in response to the risk score exceeding a predefined threshold; and
denying access to the computerized resource in response to the risk score not exceeding the predefined threshold.

8. The method as claimed in claim 1, wherein the communications device comprises a mobile wireless communications device with GPS capability.

9. The method as claimed in claim 8, wherein the communications device comprises a mobile phone.

10. A system for use in authentication, the system comprising a processor and memory, wherein the system is configured to:

store a location history in connection with a communications device associated with an entity, wherein the location history comprises locations visited by the communications device and times associated with the visits to those locations;

receive an authentication request to authenticate the identity of the entity requiring access to a computerized resource;

receive a current location of the communications device associated with the entity, and a current time;

based on the location history, the current location, and the current time, perform an analysis;

based on the analysis, determine a challenge to issue to the entity; and based on the challenge, generate an authentication wherein the authentication result can be used for granting the entity access to the computerized resource.

11. The system as claimed in claim 10, wherein the system is further configured to:
capture further records of discrete locations visited by the communications device; and
update the location history in response to capturing further records.

12. The system as claimed in claim 10, wherein the current location comprises the current geolocation co-ordinates of the communications device.

13. The system as claimed in claim 10, wherein the current location comprises the location of the communications device with respect to at least one other device.

14. The system as claimed in claim 10, wherein the location history comprises multiple records with each record including a communications device identifier, a location of the communications device and a timestamp.

15. The system as claimed in claim 10, wherein generating the authentication result comprises outputting, as an authentication signal, a risk score.

16. The system as claimed in claim 15, wherein the system is further configured to:
grant access to the computerized resource in response to the risk score exceeding a predefined threshold; and
deny access to the computerized resource in response to the risk score not exceeding the predefined threshold.

17. The system as claimed in claim 10, wherein the communications device comprises a mobile wireless communications device with GPS capability.

18. The system as claimed in claim 17, wherein the communications device comprises a mobile phone.

\* \* \* \* \*